May 28, 1940.  V. JUZI  2,202,495
REGULATING DEVICE FOR THROUGH-FLOW TUBULAR STEAM GENERATORS
Filed April 23, 1938
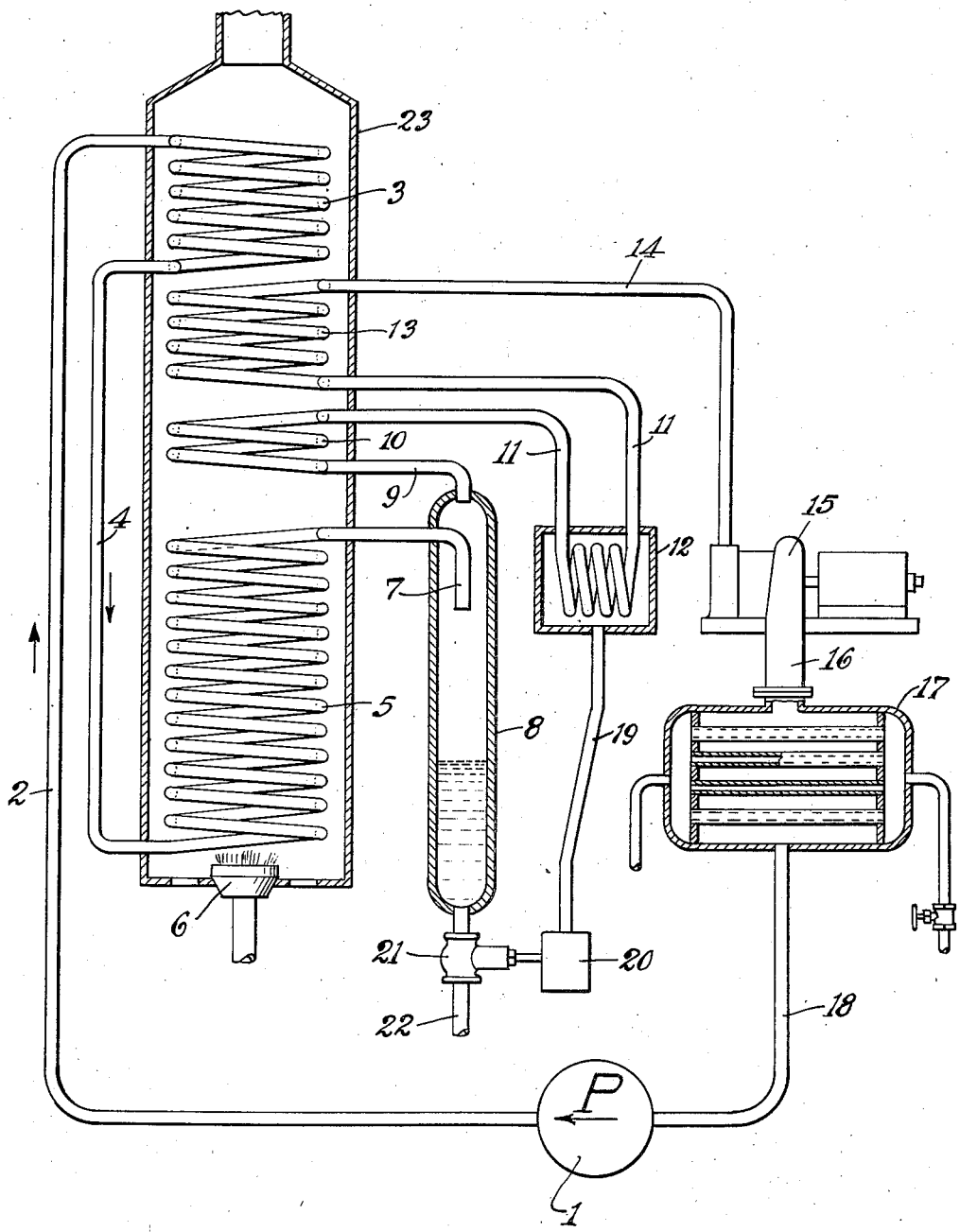
Inventor
Viktor Juzi
by Parker & Carter.
Attorneys Patented May 28, 1940

2,202,495

UNITED STATES PATENT OFFICE 2,202,495

REGULATING DEVICE FOR THROUGH-FLOW TUBULAR STEAM GENERATORS

Viktor Juzi, Ermatingen-on-the-Bodensee, Switzerland, assignor to Sulzer Freres, Societe Anonyme, Winterthur, Switzerland Application April 23, 1938, Serial No. 203,746
In Switzerland October 2, 1937

7 Claims. (Cl. 122—379)

This invention relates to a steam generator and particularly to a continuous flow generator. A special application is that in which an operating agent is controlled in its passage through the vaporization zone of a boiler at a time when it contains some water and is caused to move to a separator from which a portion of the unvaporized water is discharged preferably continuously, while the steam which still contains water is carried to a final evaporator and then to a superheater. A generator of this general type is described in my co-pending application 186,504, filed October 11, 1937.

The main object of the invention is to provide such a control which is effective to adjust or control the partial quantity of liquid removed from the separator and in which this control is accomplished in accordance to temperature variation in the steam line after the steam has passed from the separator, i. e., at the beginning of the superheater.

Another object of the invention is to provide a regulating device for controlling the flow of the operating agent in the generator of the type indicated.

Another object is to provide such a regulator which operates thermostatically and in which the thermostat is controlled in response to conditions of the steam after leaving the superheater or revaporizer.

Other objects will appear from time to time in the course of the specification and claims.

The invention is illustrated more or less diagrammatically in the accompanying figure, in which 1 is a feed pump from which the operating agent passes through a conduit 2 to a preheating portion 3 of the steam generator.

From the preheating portion 3 the operating agent flows through a conduit 4 to a vaporizing portion 5 which is arranged to be heated by a burner or source of heat 6. The operating agent passes from the heating portion 5 through a discharge 7 into a separator 8 into which it is discharged as a mixture of vaporized and unvaporized material.

For the purposes of further description, steam and water will be referred to, but it is to be understood that other operating agents might be used and this language is not to be taken as limiting the device or its operation to use in connection with water alone as the operating agent.

From the separator 8 the steam flows with a partial water content through a conduit 9 to a final vaporizing portion 10 from which it passes, as slightly superheated steam, through a conduit 11 which is associated at any desirable point with a thermostat 12 beyond which it passes into a superheater portion 13. From the superheater it moves through a conduit 14 to an engine 15 which may be a steam engine of any desired design, and the invention is not limited to an association of any particular form of steam engine. The steam passes from the engine 15 through a conduit 16 to a condenser 17 and finally through a conduit 18 again to the feed pump 1.

The thermostat 12, which may be of any desired form and arrangement, acts through a conduit 19 to actuate or control a servomotor 20, to actuate or control a discharge means contained within the housing 21 which controls a discharge outlet or conduit 22 by means of which liquid, such as water or other unvaporized operating agent, may be discharged from the separator 8.

The several preheating, vaporizing and superheating zones or apparatuses are preferably contained in a single housing indicated diagrammatically as at 23 and heated by the heating source 6. Obviously, they might otherwise be arranged and the invention is not limited in this respect to the particular arrangement shown. Also, the conduit 4 might be arranged within the housing 23 or might be outside of it as shown.

The use and operation of the invention are as follows:

In the device of the present invention the operating agent is circulated by the feed pump 1. The regulation member in the housing 21, which will ordinarily be a discharge valve is moved and controlled in response to the thermostat and the regulation of the valve or other control is thus made in response to temperature conditions beyond the separator at the beginning of the superheating portion. Thus the quantity of the liquid, which is discharged from the separator, is at all times held within proper limits and in correct ratio to the quantity of liquid which passes with the steam into the final vaporization portion 10. The quantity of liquid in the separator is at all times controlled in response to the conditions affecting the thermostat. This continuous control or regulation is not possible with the use of an over flow since by the nature of an over flow the control is intermittent and continuous regulation is not possible with it.

The apparatus according to the invention has the advantage that the final evaporator 10 is prevented from acting as a superheater while moreover the separator 8 cannot become flooded with excess of water. Thus, the quantity of water permitted to escape through the regulating valve 21 can be at all times approximately the minimum necessary for satisfactory functioning of the generator whereby the quantity of water which has to be added to the system to replace that drained off is reduced.

I claim:

1. In a tubular steam generator system a pre-heater, an evaporator, a final evaporator and a super-heater, all being in fluid circuit with each other, means for heating them, a separator positioned between said evaporator and said final evaporator, and means for discharging a part of the liquid from said separator, a thermostatic control for said discharging means, to control the quantity of liquid to be discharged, said thermostatic means positioned in the fluid circuit after the final evaporator and at the beginning of the super-heater.

2. In a once through steam generator system a pre-heater, an evaporator, a final evaporator and a super-heater, all being in fluid circuit with each other, enclosing means defining a heated zone and surrounding said members, means for heating said members, a separator positioned between said evaporator and said final evaporator and exterior of said heated zone, and means for discharging liquid from said separator, a thermostatic means positioned in the fluid circuit after the final evaporator and at the beginning of the super-heater, and connected to and adapted to contact said liquid discharge means.

3. In a steam power apparatus, the combination of a steam generator including an initial vaporization means, a final vaporization means and a super-heater, a separator, all being in fluid circuit, means for conveying vaporized and unvaporized operating agent from said vaporizing means to said separator and means for conveying vaporized and unvaporized agent from said separator to said final evaporator and means for discharging a part of said unvaporized agent from said separator and a thermostatic control for said discharging means positioned after the final evaporator and at the beginning of said super-heater and adapted to act in response to temperature conditions in the fluid circuit.

4. The method of regulating the operating agent in a once through tubular steam generator which includes the following steps: heating the operating agent in the steam generator and constantly discharging a part of liquid from a point in the system where the operating agent still contains liquid, passing the evaporated operating agent with some unevaporated agent into a zone of further heating, thereafter maintaining the agent constantly at a temperature to insure vaporization of the unvaporized portions thereof, and finally super-heating it, and regulating the said discharge of unevaporized operating agent in accordance with the heat conditions of the operating agent in the region of substantially complete vaporization and before the beginning of said super-heating.

5. The process of heating the operating agent operating in a closed circuit of a steam power installation which includes the following steps: heating the operating agent in a once through tubular steam generator to a point where a part is vaporized and another part remains unvaporized, conducting the vaporized and unvaporized operating agent to a separating zone of the generator, constantly withdrawing from that zone a portion of the unvaporized agent, conducting the vaporized agent together with another portion of the unvaporized agent to the boiler for further heating, thereafter maintaining the agent constantly at a temperature to insure vaporization of the unvaporized portions thereof, and finally superheating the agent and causing it to pass thence through the total installation, governing the rate of withdrawal of said unvaporized portion of agent in accordance with heat conditions of the agent after substantially complete evaporation and before super-heating.

6. The process of treating the operating agent operating in a closed circuit steam power installation which includes the following steps: heating the operating agent in a steam boiler to a point where some is vaporized and some remains unvaporized, conducting the vaporized and unvaporized operating agent, together to a separating zone, withdrawing from that zone continuously a portion of the unvaporized agent, conducting the vaporized agent together with another portion of said unvaporized operating agent to the boiler, vaporizing said other portion and finally super-heating the vaporized agent and causing it to pass thence through the total installation, and governing the withdrawal of unvaporized operating agent from said separating zone in accordance with temperature conditions in said operating agent after final vaporization at the beginning of super-heating.

7. The process of treating the operating agent operating in a closed circuit steam power installation which includes the following steps: heating the operating agent in a once through steam boiler to a point where some is vaporized and some remains unvaporized, conducting the vaporized and unvaporized operating agent, together to a separating zone, withdrawing from that zone continuously a portion of the unvaporized agent, conducting the vaporized agent together with another portion of said unvaporized operating agent to the boiler, vaporizing said other portion and finally super-heating the vaporized agent, and causing it to pass thence through the total installation, and governing the withdrawal of unvaporized operating agent from said separating zone in accordance with temperature conditions in said operating agent after final vaporization at the beginning of super-heating.

VIKTOR JUZI.